United States Patent
Summer et al.

(10) Patent No.: US 6,824,788 B2
(45) Date of Patent: Nov. 30, 2004

(54) FLOWABLE COTTONSEED AND METHOD FOR ITS PREPARATION

(75) Inventors: Paul Summer, Oskaloosa, IA (US); Koryu Yamamoto, Ottumwa, IA (US)

(73) Assignee: Ajinomoto U.S.A., Inc., Paramus, NJ (US)

( * ) Notice: Subject to any disclaimer, the term of this patent is extended or adjusted under 35 U.S.C. 154(b) by 92 days.

(21) Appl. No.: 09/768,623

(22) Filed: Jan. 25, 2001

(65) Prior Publication Data

US 2002/0098226 A1 Jul. 25, 2002

(51) Int. Cl.$^7$ .............................. A23K 1/00; A23K 1/18
(52) U.S. Cl. ........................ 424/438; 424/442; 426/1
(58) Field of Search ................................ 424/438, 442; 426/1

(56) References Cited

U.S. PATENT DOCUMENTS

| | | | |
|---|---|---|---|
| 3,686,392 A | * | 8/1972 | Hamada et al. ............... 424/16 |
| 3,988,480 A | | 10/1976 | Ames et al. |
| 3,991,517 A | | 11/1976 | Lewis |
| 4,016,296 A | | 4/1977 | De Santis |
| 4,027,043 A | | 5/1977 | Schroeder et al. |
| 4,062,988 A | | 12/1977 | De Santis |
| 4,160,041 A | | 7/1979 | Schroeder et al. |
| 4,171,385 A | | 10/1979 | Skoch et al. |
| 4,171,386 A | | 10/1979 | Skoch et al. |
| 4,234,608 A | | 11/1980 | Linehan et al. |
| 4,265,916 A | | 5/1981 | Skoch et al. |
| RE31,763 E | | 12/1984 | Skoch et al. |
| RE31,804 E | | 1/1985 | Skoch et al. |
| 4,499,110 A | | 2/1985 | Tomkó et al. |
| 4,702,922 A | | 10/1987 | Wiesenberger et al. |
| 4,708,877 A | | 11/1987 | Donovan et al. |
| 4,731,249 A | | 3/1988 | Findley |
| 4,735,809 A | | 4/1988 | Donovan et al. |
| 4,798,727 A | | 1/1989 | Miller |
| 4,800,092 A | | 1/1989 | Miller |
| 4,803,085 A | | 2/1989 | Findley |
| 4,826,694 A | | 5/1989 | McAskie |
| 4,904,486 A | | 2/1990 | Donovan et al. |
| 4,909,138 A | | 3/1990 | McAskie |
| 4,963,371 A | | 10/1990 | Miller |
| 4,994,282 A | | 2/1991 | Miller |
| 5,068,114 A | | 11/1991 | Chanen et al. |
| 5,073,388 A | | 12/1991 | Miller |
| 5,204,102 A | | 4/1993 | Coles et al. |
| 5,363,754 A | | 11/1994 | Coles et al. |
| 5,382,678 A | * | 1/1995 | Vinci et al. ................. 554/156 |
| 5,560,920 A | | 10/1996 | Goff et al. |
| 5,626,891 A | | 5/1997 | Aii et al. |
| 5,750,466 A | | 5/1998 | Wedegaertner et al. |
| 5,972,414 A | | 10/1999 | Harris |
| 6,051,269 A | | 4/2000 | Harris |

OTHER PUBLICATIONS

A.C. Sheperd, et al., "Long–Term Effects of Acetate and Propionate on Voluntary Feed Intake by Midlactation Cows", J. Dairy Sci, vol. 81, pp. 2240–2250, 1998.

D.M. Waltz, et al., "Effect of Acid and Alkali Treatment of Soybean Meal on Nitrogen Utilization by Ruminants", J. Anim. Sci., vol. 63, pp. 879–887, 1986.

* cited by examiner

*Primary Examiner*—Neil S. Levy
(74) *Attorney, Agent, or Firm*—Oblon, Spivak, McClelland, Maier & Neustadt, P.C.

(57) ABSTRACT

A method for the preparation of a handleable, flowable coated cottonseed product is provided which involves coating cottonseed with a composition of (a) water or a liquid feed product, (b) a soluble phosphorous source and (c) a metal compound capable of interacting with the soluble phosphorous source to form a coating on the cottonseed, and curing the coating formed thereby, and the flowable cottonseed product formed thereby, as well as its use as a feed supplement for ruminants such as cattle, as a plantable source of cottonseed, and in a method for treatment and/or prevention of urinary calculi or prevention of milk fever in cattle.

47 Claims, No Drawings

US 6,824,788 B2

FLOWABLE COTTONSEED AND METHOD FOR ITS PREPARATION

BACKGROUND OF THE INVENTION

1. Field of the Invention

The present invention relates to a cottonseed composition having improved flowability and handlability and a method for its preparation, and its use as a feed for ruminants, particularly cattle or as a plantable source of cottonseed.

2. Discussion of the Background

Cottonseed is an ideal feed ingredient for ruminants, due to the balanced combination of protein, fiber and other nutrients contained therein. However, its use has not been widespread, due to significant handling problems. Cottonseed used for feeding has an outer coating of short cotton linters (short fibrous "hair-like" structures). These linters remain on the cottonseed after processing in cotton gins. During normal handling, the linters cause the cottonseed to clump together and cause difficulties in handling with traditional feed-grain handling equipment.

One solution proposed for this problem has been the preparation of a starch coated cottonseed. This is described in Wedegaertner, U.S. Pat. No. 5,750,466. The starch-coated cottonseed is produced by spraying gelatinized starch on the cottonseed and drying the coating. However, this process is very energy intensive and expensive, requiring significant expenditures in equipment for its production.

A different proposal for solving this problem has been proposed in a process for delinting the cottonseed by treatment with dilute acid or base, followed by drying, buffing and neutralization. The product so produced however, is not used for feed, but is instead used as cottonseed for planting.

Accordingly, a method is needed to prepare a more easily handled, flowable cottonseed that requires no expensive drying equipment

SUMMARY OF THE INVENTION

Accordingly, one object of the present invention is to provide a readily handleable and flowable cottonseed product suitable for use in conventional feed-grain handling equipment.

A further object of the present invention is to provide a method for the production of a flowable, handleable cottonseed product.

A further object of the present invention is to provide a ruminant feed containing such a flowable cottonseed product.

A further object of the present invention is to provide a method for the treatment and/or prevention of urinary calculi in cows using a preferred flowable cottonseed product of the present invention.

A further object of the present invention is to provide a method for the prevention of milk fever in cows using a preferred flowable cottonseed product of the present invention.

These and other objects of the present invention have been satisfied by the discovery of a coated cottonseed product comprising cottonseed coated with a coating composition comprising (a) water or a liquid feed product, (b) a soluble phosphorous source and (c) a metal compound that interacts with the soluble phosphorous source to create a shell around the cottonseed, a method for its production and its use as a feed or plantable source of cottonseed.

DETAILED DESCRIPTION OF THE PREFERRED EMBODIMENTS

The present invention relates to a method for the production of a flowable, handleable cottonseed and the cottonseed product produced thereby. In particular, the cottonseed product of the present invention comprises cottonseed having cured coating formed from a mixture of either water or a liquid feed product, such as condensed fermentation solubles, corn steep liquor, distillers solubles or molasses, along with a phosphorous source and a metal compound that interacts with the soluble phosphorous source to create a shell around the cottonseed, such as an alkaline earth metal.

The method of the present invention comprises coating cottonseed with a coating composition comprising:

(a) either water or a liquid feed product, preferably a member selected from the group consisting of condensed fermentation solubles, corn steep liquor, distillers solubles and molasses;

(b) a soluble phosphorous source; and (c) a metal that interacts with the soluble phosphorous source to create a coating around the cottonseed.

Upon coating the cottonseed with the above composition, the phosphorous and alkaline earth metal compound cause curing of the liquid feed product, such as condensed fermentation solubles, corn steep liquor, distillers solubles or molasses, to form a hardened coat on the cottonseed. The resulting coated cottonseed is readily handleable and flowable, using conventional feed-grain handling equipment.

The liquid feed product (within the context of the present invention, the liquid feed product includes both products and byproducts of fermentation processes, grain processing or molasses production including beet, cane or citrus) can be any composition formed by fermentation, grain processing or molasses production that can be caused to harden by mixing with a phosphorous source and an alkaline earth metal. Suitable liquid feed products include condensed fermentation solubles, corn steep liquor, distillers solubles, yeast paste, liquid whey or molasses. Preferred embodiments of liquid feed products include condensed glutamic fermentation solubles, such as Proteferm® (a byproduct of monosodium glutamate fermentation available from Ajinomoto USA, Inc.). In one embodiment, even water alone can be the liquid of the coating composition.

In the process of the present invention, any source of soluble phosphorous is sufficient. (Within the context of the present invention, the term "soluble phosphorous" means a compound or composition capable of providing phosphorous in a water-soluble form.) Suitable soluble phosphorous sources include, but are not limited to, phosphoric acid, phosphorous acid, diammonium phosphate, monoammonium phosphate, alkali and alkaline metal phosphates, alkali and alkaline metal phosphonates. The phosphorous can be provided as a single compound or as a mixture of two or more compounds.

With respect to the metal compound, any salt of a metal capable of causing an exothermic reaction with the phosphorous source is acceptable, so long as no toxicity to the consumer of the final product is present. Preferred salts include sulfates, carbonates, halides, oxides, hydroxides, propionates, and acetates. Preferred metal compounds are salts of an alkaline earth metal or aluminum. More preferred alkaline earth metal sources include salts of Ca, Mg and Al, such as calcium carbonate, calcium oxide, calcium chloride, calcium sulfate, calcium hydroxide, calcium propionate, calcium acetate, magnesium oxide, magnesium chloride, magnesium sulfate, magnesium hydroxide and aluminum oxide, with calcium carbonate and magnesium oxide being most preferred. The metal compound can be provided in a single compound or in a combination of two or more compounds. Further, two or more different metal compounds can be used in combination.

The coating composition of the present invention can use the components (a)–(c) in any desired ratios, so long as the resulting coating composition can cure to form a coating on the cottonseed, preferably a hardened (i.e. non-sticky or non-tacky) coating. Preferably, the coated cottonseed product comprises from 42 to 85% by weight of cottonseed, from 10 to 30% by weight of the liquid feed product (or water), from 3 to 10% by weight of phosphorous (on a phosphoric acid basis), and from 2 to 8% by weight of the metal compound (on a wt % metal basis). Most preferably, the composition comprises from 50 to 80% by weight of cottonseed, from 15 to 27% by weight of liquid feed product (or water), from 3.5 to 7% by weight of phosphorous and from 2.5 to 5% by weight of metal compound.

It is possible to provide the phosphorous and the metal compound in the same compound, such as an alkaline earth metal phosphate, so long as the phosphate is initially water soluble.

In addition to the required components of the present invention, the present coated cottonseed can include other additives, such as enzymes, amino acids, water absorbers, mold inhibitors, vitamins, minerals, direct fed microbials and other feed additives. One preferred additive is sodium bentonite or calcium bentonite, which can function as both a water absorber and mold inhibitor. Of particular note, the present invention permits the inclusion of heat or chemically sensitive enzymes into the coated cottonseed product, which is not possible with conventional methods requiring significant heated drying steps or acid or base treatments.

Once the cottonseed is coated with the coating composition of the present invention, the coated product is permitted to cure, thus causing the coating to harden. The curing process is temperature and time dependent, but normally lasts from several hours to several weeks. Preferably, the conditions (airflow, relative humidity, ambient temperature) are chosen such that the curing takes from 1 to 10 days, most preferably about 2 to 4 days. The curing step can be performed in any storage area, but is preferably performed on a flattened surface, in order to avoid sticking of the individual grains of coated cottonseed to one another prior to complete curing. In one embodiment, the curing is performed on a drying floor, through which air is flowing at ambient temperature, or even with the air or floor being slightly heated to speed the curing process. The air used for the curing process can also be low relative humidity air, in order to speed the curing process by withdrawing excess moisture from the coating as it cures.

In a preferred process of coating the cottonseed, the cottonseed is first coated with an aqueous solution of alkaline earth metal, such as calcium carbonate or magnesium oxide. Separately, a liquid solution is prepared containing the water or liquid feed product, the soluble phosphorous source, such as phosphoric acid, and if desired other additives, such as sodium bentonite. The liquid solution is then combined with the alkaline earth metal coated cottonseed, to permit the coating to be formed and the curing reaction to begin.

The cottonseed product formed according to the present invention can be used as a feed for ruminants, such as cattle, as well as for a plantable source of cottonseed that is readily handled without clumping, using conventional feed and grain handling equipment. The coating of the cottonseed can provide additional nutrients, either to the ruminant animal or to the seed as it germinates, thus enhancing the value of the cottonseed to the animal or to the farmer that has planted it. The product of the present invention has improved handling characteristics and significantly greater bulk density compared to whole fuzzy cottonseed. Other advantages include:

Improved handling with traditional grain handling equipment versus bulk handling used with whole fuzzy cottonseed;

High energy input drying requiring large capital investments not required for production;

Mixes into total mixed rations better and more uniformly than whole fuzzy cottonseed, resulting in more uniform intake of nutrients;

Provides ability to add liquid byproducts to dairy rations without the need for specialized liquid handling equipment currently required;

Micro-nutrients, as well as direct fed microbials, can be added in the coating process to provide more uniform dispersion in the feed;

Provides a means for incorporating higher levels of molasses while avoiding problem of stickiness normally associated with such feeds.

Provides increased bulk density of the cottonseed (present invention about 28 lbs/ft, conventional cottonseed about 22 lbs/ft), lowering transportation costs and storage costs.

The present invention further relates to methods for the prevention and treatment of urinary calculi (or water belly) in ruminants, as well as the prevention of milk fever. Urinary calculi is a problem encountered in ruminants due to mineral deposits in the urinary tract. Typically such prolonged blockage can result in rupture of the urinary bladder or urethra, releasing urine into the surrounding tissues. This produces the condition known as "water belly". Urinary calculi of the phosphatic type is formed principally under feedlot conditions due to nutritional conditions that promote the formation of urine that is alkaline and has a high phosphorous content, while the animal has a deficiency of calcium. Normally, in order to treat or prevent such a condition from occurring, it is necessary to supplement the animals feed with calcium supplements, or by feeding ammonium chloride or ammonium sulfate to the animal. The preferred coated cottonseed product of the present invention, wherein the liquid feed product is Proteferm, can be used to prevent and/or treat urinary calculi or water belly, since Proteferm contains a significant level of ammonium chloride.

Milk fever is a condition that affects about 6% of dairy cows in the U.S. each year. This condition results in decreased calcium concentration in the blood (below 5 mg/dl), which does not permit muscles and nerves to function properly. Normal blood calcium levels are around 9 to 10 mg/dl. One conventional preventative for milk fever is to supplement the cows diet with anionic elements, such as chloride or sulfate, for example by the addition of ammonium chloride to the diet. This causes a decrease in blood pH. As in the above noted treatment of urinary calculi, the preferred embodiment of the coated cottonseed of the present invention, having a coating of Proteferm, provides significant levels of ammonium chloride, as well as other nutrients. This can help prevent the occurrence of milk fever without requiring any additional feed supplements.

Having generally described this invention, a further understanding can be obtained by reference to certain specific examples which are provided herein for purposes of illustration only and are not intended to be limiting unless otherwise specified.

EXAMPLES

Example 1

Cottonseed (1080 lbs) is thoroughly mixed with 80 lbs of calcium carbonate to coat the cottonseed with the calcium carbonate. A solution is then formed by combining 500 lbs of Proteferm (a condensed glutamic acid fermentation solubles product available from Ajinomoto USA), 140 lbs of 75% aqeuous phosphoric acid and 200 lbs of sodium bentonite. The resulting solution is then combined with the calcium carbonate-coated cottonseed to coat the cottonseed with the Proteferm containing solution. The coating thus formed is allowed to cure and harden at ambient temperature to provide 2000 lbs of coated cottonseed. Batches of coated cottonseed using the same percentages of components, but on a smaller scale resulted in a final coated cottonseed product that was flowable and easily handleable with conventional grain handling equipment.

Example 2

Cottonseed (1440 lbs) is thoroughly mixed with 60 lbs of calcium carbonate to coat the cottonseed with the calcium carbonate. A solution is then formed by combining 400 lbs of Proteferm (a condensed glutamic acid fermentation solubles product available from Ajinomoto USA), and 100 lbs of 75% aqeuous phosphoric acid. The resulting solution is then combined with the calcium carbonate-coated cottonseed to coat the cottonseed with the Proteferm containing solution. The coating thus formed is allowed to cure and harden at ambient temperature to provide 2000 lbs of coated cottonseed. Batches of coated cottonseed using the same percentages of components, but on a smaller scale, resulted in a final coated cottonseed product that was flowable and easily handleable with conventional grain handling equipment.

Obviously, additional modifications and variations of the present invention are possible in light of the above teachings. It is therefore to be understood that within the scope of the appended claims, the invention may be practiced otherwise than as specifically described herein.

What is claimed is:

1. A method for the production of a coated cottonseed product, comprising:
    coating intact cottonseed with a coating composition comprising (a) a material selected from the group consisting of water and one or more liquid feed product (s), (b) a soluble phosphorous source and (c) a metal compound capable of interacting with said soluble phosphorous source to produce a coating on the cottonseed; and
    curing the coated cottonseed formed thereby.

2. The method of claim 1, wherein said liquid feed product is selected from the group consisting of condensed fermentation solubles, corn steep liquor, distillers solubles yeast paste, liquid whey and molasses.

3. The method of claim 2, wherein said liquid feed product is condensed glutamic acid fermentation solubles.

4. The method of claim 1, wherein said soluble phosphorous source is selected from the group consisting of phosphoric acid, phosphorous acid, diammonium phosphate, monoammonium phosphate, alkali and alkaline metal phosphates, alkali and alkaline metal phosphonates.

5. The method of claim 4, wherein said soluble phosphorous source is phosphoric acid.

6. The method of claim 1, wherein said metal compound is a one or more compound(s) selected from the group consisting of alkaline earth metal compounds and aluminum compounds.

7. The method of claim 6, wherein said metal compound is one or more salt(s) selected from the group consisting of calcium salts and magnesium salts.

8. The method of claim 7, wherein said metal compound is selected from the group consisting of calcium carbonate, calcium oxide, calcium chloride, calcium sulfate, calcium hydroxide, calcium propionate, calcium acetate, magnesium oxide, magnesium chloride, magnesium sulfate, and magnesium hydroxide.

9. The method of claim 6, wherein said metal compound is aluminum oxide.

10. The method of claim 8, wherein said metal compound is calcium carbonate or magnesium oxide.

11. The method of claim 1, wherein said coating composition comprises from 10 to 30 wt % of (a), from 3 to 10 wt % of (b) and from 2 to 8 wt % of (c), based on total weight of the coated cottonseed product.

12. The method of claim 1, wherein said coating composition further comprises one or more additive(s) selected from the group consisting of enzyme(s), amino acid(s), water absorber(s), vitamin(s), mineral(s), direct fed microbial(s) and mold inhibitor(s).

13. The method of claim 1, wherein said coating step comprises:
    coating intact cottonseed with (c) said metal compound;
    forming a liquid solution of (a) said water or liquid feed product and (b) said soluble phosphorous source; and
    combining said liquid solution with the cottonseed coated with (c).

14. A coated cottonseed product, comprising:
    intact cottonseed, and a cured coating prepared from a coating composition comprising:
    (a) a material selected from the group consisting of water and one or more liquid feed product(s), (b) a soluble phosphorous source and (c) a metal compound that interacts with said soluble phosphorous source to form a coating on said cottonseed.

15. The product of claim 14, wherein said liquid feed product is selected from the group consisting of condensed fermentation solubles, corn steep liquor, distillers solubles yeast paste, liquid whey and molasses.

16. The product of claim 15, wherein said liquid feed product is condensed glutamic acid fermentation solubles.

17. The product of claim 14, wherein said soluble phosphorous source is selected from the group consisting of phosphoric acid, phosphorous acid, diammonium phosphate, monoammonium phosphate, alkali and alkaline metal phosphates, alkali and alkaline metal phosphonates.

18. The product of claim 17, wherein said soluble phosphorous source is phosphoric acid.

19. The product of claim 14, wherein said metal compound is a compound selected from the group consisting of alkaline earth metal compounds and aluminum compounds.

20. The product of claim 19, wherein said metal compound is a one or more salt(s) selected from the group consisting of calcium salts and magnesium salts.

21. The product of claim 20, wherein said metal compound is selected from the group consisting of calcium carbonate, calcium oxide, calcium chloride, calcium sulfate, calcium hydroxide, calcium propionate, calcium acetate, magnesium oxide, magnesium chloride, magnesium sulfate, and magnesium hydroxide.

22. The product of claim 19, wherein said metal compound is aluminum oxide.

23. The product of claim 21, wherein said metal compound is calcium carbonate or magnesium oxide.

24. The product of claim 14, wherein said coating composition comprises from 10 to 30 wt % of (a), from 3 to 10 wt % of (b) and from 2 to 8 wt % of (c), based on total weight of the coated cottonseed product.

25. The product of claim 14, wherein said coating composition further comprises one or more additive(s) selected from the group consisting of enzyme(s), amino acid(s), water absorber(s), vitamin(s), mineral(s), direct fed microbial(s) and mold inhibitor(s).

26. A ruminant feed composition, comprising:
  intact cottonseed; and a cured coating prepared from a coating composition comprising:
  (a) material selected from the group consisting of water and one or more liquid feed product(s), (b) a soluble phosphorous source and (c) a metal compound that interacts with said soluble phosphorous source to provide a coating on said cottonseed, and
  one or more conventional ruminant feed constituent(s).

27. The composition of claim 26, wherein said liquid feed product is selected from the group consisting of condensed fermentation solubles, corn steep liquor, distillers solubles yeast paste, liquid whey and molasses.

28. The composition of claim 27, wherein said liquid feed product is condensed glutamic acid fermentation solubles.

29. The composition of claim 26, wherein said soluble phosphorous source is selected from the group consisting of phosphoric acid, phosphorous acid, diammonium phosphate, monoammonium phosphate, alkali and alkaline metal phosphates, alkali and alkaline metal phosphonates.

30. The composition of claim 29, wherein said soluble phosphorous source is phosphoric acid.

31. The composition of claim 26, wherein said metal compound is a compound selected from the group consisting of alkaline earth metal compounds and aluminum compounds.

32. The composition of claim 31, wherein said metal compound is one or more salt(s) selected from the group consisting of calcium salts and magnesium salts.

33. The composition of claim 32, wherein said metal compound is selected from the group consisting of calcium carbonate, calcium oxide, calcium chloride, calcium sulfate, calcium hydroxide, calcium propionate, calcium acetate, magnesium oxide, magnesium chloride, magnesium sulfate, and magnesium hydroxide.

34. The composition of claim 31, wherein said metal compound is aluminum oxide.

35. The composition of claim 33, wherein said metal compound is calcium carbonate or magnesium oxide.

36. The composition of claim 26, wherein said coating composition comprises from 10 to 30 wt % of (a), from 3 to 10 wt % of (b) and from 2 to 8 wt % of (c), based on total weight of the coated cottonseed product.

37. The composition of claim 26, wherein said coating composition further comprises one or more additive(s) selected from the group consisting of enzyme(s), amino acid(s), water absorber(s), vitamin(s), mineral(s), direct fed microbial(s) and mold inhibitor(s).

38. A method comprising:
  administering to livestock a ruminant feed composition comprising:
  intact cottonseed, and a cured coating prepared from a coating composition comprising:
  (a) condensed glutamic acid fermentation solubles, (b) a soluble phosphorous source and (c) a metal compound that interacts with said soluble phosphorous source to provide a coating on said cottonseed, and
  one or more conventional ruminant feed constituents.

39. The method of claim 38, wherein said soluble phosphorous source is a material selected from the group consisting of phosphoric acid, phosphorous acid, diammonium phosphate, monoammonium phosphate, alkali and alkaline metal phosphates, alkali and alkaline metal phosphonates.

40. The method of claim 38, wherein said soluble phosphorous source is phosphoric acid.

41. The method of claim 38, wherein said metal compound is one or more compound(s) selected from the group consisting of alkaline earth metal compounds and aluminum compounds.

42. The method of claim 38, wherein said metal compound is one or more salt(s) selected from the group consisting of calcium salts and magnesium salts.

43. The method of claim 38, wherein said metal compound is selected from the group consisting of calcium carbonate, calcium oxide, calcium chloride, calcium sulfate, calcium hydroxide, calcium propionate, calcium acetate, magnesium oxide, magnesium chloride, magnesium sulfate, and magnesium hydroxide.

44. The method of claim 38, wherein said metal compound is aluminum oxide.

45. The method of claim 38, wherein said metal compound is calcium carbonate or magnesium oxide.

46. The method of claim 38, wherein said coating composition comprises from 10 to 30 wt % of (a), from 3 to 10 wt % of (b) and from 2 to 8 wt % of (c), based on total weight of the coated cottonseed product.

47. The method of claim 38, wherein said coating composition further comprises one or more additive(s) selected from the group consisting of one or more enzyme(s), amino acid(s), water absorber(s), vitamin(s), mineral(s), direct fed microbial(s) and mold inhibitor(s).

* * * * *